United States Patent
Li et al.

(10) Patent No.: US 12,269,022 B2
(45) Date of Patent: Apr. 8, 2025

(54) HIGHLY-DISPERSED HYDROGENATION CATALYST, PREPARATION METHOD THEREOF, AND USE THEREOF IN PREPARATION OF BIOFUEL FROM PALM OIL OR OTHER OIL

(71) Applicant: NANKAI UNIVERSITY, Tianjin (CN)

(72) Inventors: Wei Li, Tianjin (CN); Siyang Liu, Tianjin (CN); Qingxin Guan, Tianjin (CN)

(73) Assignee: NANKAI UNIVERSITY, Tianjin (CN)

(*) Notice: Subject to any disclaimer, the term of this patent is extended or adjusted under 35 U.S.C. 154(b) by 589 days.

(21) Appl. No.: 17/631,803

(22) PCT Filed: Sep. 20, 2019

(86) PCT No.: PCT/CN2019/106882
§ 371 (c)(1),
(2) Date: Jan. 31, 2022

(87) PCT Pub. No.: WO2021/027018
PCT Pub. Date: Feb. 18, 2021

(65) Prior Publication Data
US 2022/0266234 A1 Aug. 25, 2022

(30) Foreign Application Priority Data
Aug. 13, 2019 (CN) .......................... 201910744183.0

(51) Int. Cl.
*B01J 35/39* (2024.01)
*B01J 21/04* (2006.01)
(Continued)

(52) U.S. Cl.
CPC ............. *B01J 35/399* (2024.01); *B01J 21/04* (2013.01); *B01J 21/063* (2013.01); *B01J 23/002* (2013.01);
(Continued)

(58) Field of Classification Search
CPC ........ B01J 21/04; B01J 21/063; B01J 21/066; B01J 23/002; B01J 23/755; B01J 23/883;
(Continued)

(56) References Cited

U.S. PATENT DOCUMENTS

| 2007/0161714 A1* | 7/2007 | Rytter | ...................... B01J 23/80 |
| | | | 518/718 |
| 2012/0252665 A1* | 10/2012 | Hughes | ................... C01F 7/442 |
| | | | 502/439 |
| 2018/0264450 A1 | 9/2018 | Soled et al. | |

FOREIGN PATENT DOCUMENTS

| CN | 101270300 A | 9/2008 |
| CN | 105126898 A | 12/2015 |

(Continued)

OTHER PUBLICATIONS

Machine translation of Lee et al. (Year: 2018).*
(Continued)

*Primary Examiner* — Brian A McCaig
(74) *Attorney, Agent, or Firm* — Bayramoglu Law Offices LLC

(57) ABSTRACT

A highly-dispersed hydrogenation catalyst, a preparation method thereof, and use thereof in the preparation of biofuel from palm oil or other oil are provided. The combination of maleic anhydride-grafted polypropylene (MA-PP) and a silane coupling agent (SCA) is introduced into an aluminum oxide composite carrier through organic amidation to obtain a uniformly-dispersed composite carrier with regular pores. Moreover, through a multi-stage impregnation and roasting process, a particle size of an active component is greatly reduced, and the dispersion of the active component and the number of active sites are improved. A hydrogenation catalyst with high hydrothermal stability, high hydrogenation activity, and long life is prepared based on the composite carrier with regular pores and used in the preparation of (Continued)

biofuel from vegetable oil or other oil through hydrodeoxygenation (HDO), which has great industrial application value.

9 Claims, 2 Drawing Sheets

(51) Int. Cl.
    *B01J 21/06*     (2006.01)
    *B01J 23/00*     (2006.01)
    *B01J 23/888*     (2006.01)
    *B01J 35/30*     (2024.01)
    *B01J 37/02*     (2006.01)
    *C10G 45/08*     (2006.01)

(52) U.S. Cl.
    CPC ....... *B01J 23/8885* (2013.01); *B01J 37/0225* (2013.01); *C10G 45/08* (2013.01); *C10G 2300/202* (2013.01)

(58) Field of Classification Search
CPC .... B01J 23/888; B01J 23/8885; B01J 35/393; B01J 35/399; B01J 37/0205; B01J 37/0207; B01J 37/0209; B01J 37/0225; B01J 2523/00; C10G 3/46; C10G 45/08; C10G 2300/202; C10G 2300/44; C10G 2400/04
See application file for complete search history.

(56) References Cited

FOREIGN PATENT DOCUMENTS

| | | | | |
|---|---|---|---|---|
| CN | 105749927 A | 7/2016 | | |
| CN | 106391107 A | 2/2017 | | |
| CN | 105344344 B | 1/2018 | | |
| CN | 107913715 A | 4/2018 | | |
| CN | 108043424 A | 5/2018 | | |
| KR | 20080043161 | * | 5/2008 | ............. B01J 21/04 |
| WO | WO-2014020557 A1 | * | 2/2014 | ............. B01J 21/066 |

OTHER PUBLICATIONS

Dong Guangda, et al., Preparation of the Second Generation Biodiesel via Hydrodeoxygenation of Cottonseed Oil, Petrochemical Technology, 2013, pp. 737-742, vol. 42, No. 7.

Zuo Hua-Liang, et al., Catalytic hydrodeoxygenation of vegetable oil over Ni catalysts to produce second-generation biodiesel, Journal of Fuel Chemistry and Technology, 2012, pp. 1067-1073, vol. 40, No. 9.

Zhang Dengqian, et al., Study on NiMo/$ZrO_2$—$Al_2O_3$ Catalysts for Ultra Deep HDS of Diesel, Industrial Catalysis, 2008, pp. 117-121, vol. 16, No. 10.

* cited by examiner

HIGHLY-DISPERSED HYDROGENATION CATALYST, PREPARATION METHOD THEREOF, AND USE THEREOF IN PREPARATION OF BIOFUEL FROM PALM OIL OR OTHER OIL

CROSS REFERENCE TO RELATED APPLICATIONS

This application is the national stage entry of International Application No. PCT/CN2019/106882, filed on Sep. 20, 2019, which is based upon and claims priority to Chinese Patent Applications No. 201910744183.0, filed on Aug. 13, 2019, the entire contents of which are incorporated herein by reference.

TECHNICAL FIELD

The present disclosure relates to a highly-dispersed hydrogenation catalyst, a preparation method thereof, and the use thereof in the preparation of a biofuel from palm oil or other oil.

BACKGROUND

Environment and energy problems have gradually become the most concerning issues in the world, and renewable biofuels show great advantages and potential in the environment and energy issues. According to a life cycle assessment, biofuels can reduce carbon emissions by 50% to 90%. With the economic development in China, China has gradually become a big consumer of jet fuel. According to the latest data from the National Bureau of Statistics of China, the annual jet fuel consumption in China reached 36.586 million tons in 2015 and would exceed 40 million tons in the next two years, and the diesel consumption reached 173 million tons in 2015. Therefore, according to the 50% blending of bio-jet fuel, the Civil Aviation Organization predicts that China requires 6 million tons of "pure" biomass jet fuel to produce 30% of bio-jet fuel, and the demand for biodiesel is huge, making the total output value reach hundreds of billions of yuan. At present, biodiesel in China and even in the world is a lipid product from methyl esterification of an oil and alcohol under an acid-base catalyst, but the biodiesel has only a blending amount of 5% with a petroleum-based diesel because a lipid diesel has a low cetane number and a low calorific value, thereby exhibiting combustion performance inferior to that of a petroleum-based diesel. In the present disclosure, the C15-C18 alkane obtained by directly subjecting a vegetable oil to hydrodeoxygenation (HDO) is of the same composition as a petroleum-based diesel, and has a high cetane number and a high calorific value, thereby exhibiting prominent combustion performance. In addition, by adjusting a catalyst, a small amount of biogasoline and bio-jet fuel components other than the diesel component can also be obtained.

The Chinese patent No. CN201510640818.4 discloses a modified eggshell biodiesel catalyst, and a preparation method and use thereof, where an eggshell powder is immersed and roasted by sodium hydroxide and sodium nitrate to effectively increase alkaline and acidic active groups, thereby improving the catalytic activity for the preparation of biodiesel. The Chinese patent No. CN201711313471.8 discloses a biodiesel catalyst, where a cellulose powder (as a raw material) is subjected to carbonization and sulfonation to prepare a carbon-based solid acid catalyst, i.e. the biodiesel catalyst.

In the above patents, an acid or alkali catalyst is used to prepare biodiesel through esterification. However, for the diesel obtained through methyl esterification, the post-treatment catalyst emission may bring corrosion and pollution to the environment, and the biodiesel obtained through methyl esterification has a relatively low cetane number and calorific value. Moreover, in an HDO reaction, the high activity and the influence of the by-product (water) on the catalyst are key factors.

The Chinese patent No. CN201510489007.9 discloses an HDO isomerization catalyst, including an ultra-stable Y molecular sieve-supported metal HDO catalyst and a molecular sieve-supported precious metal hydroisomerization catalyst. The HDO catalyst is prepared by loading a metal selected from the group consisting of Zn, Ni, and Cu through the deposition-precipitation method; and the hydroisomerization catalyst is prepared by loading a precious metal selected from the group consisting of Pt, Pd, and Ru on a microporous molecular sieve selected from the group consisting of SAOP-11, SAPO-31, SAPO-34, HZSM-5, HZSM-22, and HBEA through the impregnation method. The catalyst is used in the preparation of a diesel with a high cetane number from gutter oil.

The Chinese patent No. CN201711173791.8 discloses an HDO catalyst, and a preparation method and use thereof. In the HDO catalyst, $\gamma$-$Al_2O_3$ serves as a carrier, Ni and Mo serve as an active component, and a mass of the active component accounts for 16% to 25% of a total mass of the HDO catalyst. The preparation method simplifies the existing preparation steps, and does not require expensive carriers, active components, and other materials, thereby reducing the preparation cost. The HDO catalyst has high HDO treatment activity and can maintain stable for a long time.

Dong Guangda, et al. of Tsinghua University disclosed a method of preparing a Ni—Mo/$\gamma$-$Al_2O_3$ catalyst through kneading and impregnation, and conducted X-ray diffractometry (XRD), Brunauer-Emmett-Teller (BET), and transmission electron microscopy (TEM) characterizations on the catalyst (*Petrochemical Technology*, 2013, Vol. 42 (7)). Specifically, cottonseed oil was used as a raw material and n-octane was used as a solvent, and the performance of the Ni—Mo/$\gamma$-$Al_2O_3$ catalyst was evaluated using a fixed-bed microreactor. The cottonseed oil is subject to hydrosaturation, HDO, and hydrodecarbonization to obtain C15 to C18 linear diesel alkanes, i.e., the second-generation biodiesel.

Zuo Hualiang of Guangzhou Institute of Energy Conversion, Chinese Academy of Sciences disclosed a study on the preparation of high-quality biodiesel fuels, wherein HDO was conducted on methyl palmitate (as a vegetable oil model compound) in a semi-continuous reactor to obtain a high-quality biodiesel fuel (*Journal of Fuel Chemistry and Technology*, 2012, Volume 40 (9)). Specifically, Ni catalysts supported by the four carriers HY, $SiO_2$, $\gamma$-$Al_2O_3$, and SAPO-11 were prepared by the incipient wetness impregnation method, and the catalysts were characterized by XRD, $NH_3$-temperature-programmed desorption (TPD), $H_2$-temperature programmed reduction (TPR), BET, SEM, and other techniques. Results showed that, due to the weak acid and medium strong acid properties on the surface of SAPO-11, the Ni/SAPO-11 catalyst suppressed the cracking reaction while maintaining the high HDO reactivity.

The above disclosures involved catalysts for the second generation HDO biodiesel and use thereof, where catalysts are typically prepared by loading an active metal on a molecular sieve or through aluminum oxide impregnation and roasting, thereby possessing a high initial activity and avoiding pollution in a reaction process. However, in the above disclosures, only the carrier, the active component, and contents thereof are changed, and then corresponding different HDO and isomerization activities are investigated. For the improvement of hydrogenation activity and the selectivity of a desired product, the dispersion of an active component in a carrier, the number of active sites, and the like all determine the hydrogenation activity. The carrier, the adjustment of an acid site, and the binding strength and uniformity of a composite carrier affect the rearrangement of carbonium ions to a great extent, thereby affecting the selectivity of a product. The present disclosure makes progress in the active component, the active site, and the binding of a composite carrier, which greatly improves the hydrogenation activity and the product selectivity.

SUMMARY

In order to solve the environmental pollution problem of the above catalysts and the technical problems in the preparation of a high-activity HDO catalyst, the present disclosure provides a highly-dispersed hydrogenation catalyst, a preparation method thereof, and use thereof in the preparation of a biofuel from palm oil or other oil. The second-generation vegetable oil biodiesel is prepared through a pollution-free HDO process, namely, a biodiesel with C15 to C18 alkanes as main components, which improves the combustion performance of the diesel and reduces the environmental pollution. The combination of maleic anhydride-grafted polypropylene (MA-PP) and a silane coupling agent (SCA) is introduced into an aluminum oxide composite carrier through organic amidation to obtain a uniformly-dispersed composite carrier with regular pores. Moreover, through a multi-stage impregnation and roasting process, a particle size of an active component is greatly reduced, and the dispersion of the active component and the number of active sites are improved. A catalyst with high hydrothermal stability, high hydrogenation activity, and long life is prepared based the composite carrier with regular pores and used in the preparation of a biofuel from a vegetable oil or other oil through HDO, which has great industrial application value.

The present disclosure adopts the following technical solutions: An aluminum oxide composite carrier is provided, where MA-PP and an SCA undergo amidation, then $\gamma$-$Al_2O_3$ and tetrabutyl titanate (TBT) are added, and a resulting solid material is dried and roasted to form the composite carrier, which is an aluminum oxide-titanium dioxide carrier.

Preferably, MA-PP and an SCA undergo amidation, then $\gamma$-$Al_2O_3$ and tetrabutyl zirconate (TBZ) are added, and a resulting solid material is dried and roasted to form the composite carrier, which is an aluminum oxide-zirconium dioxide carrier.

Preferably, a mass percentage of the titanium dioxide in the composite carrier may be 5% to 20%.

Preferably, a mass percentage of the titanium dioxide in the composite carrier may be 10%.

Preferably, a mass percentage of the zirconium dioxide in the composite carrier may be 5% to 20%.

Preferably, a mass percentage of the zirconium dioxide in the composite carrier may be 15%.

Preferably, the SCA may be KH-550.

Preferably, 1% to 5% MA-PP may be added to an ethanol solution with 1% to 5% of KH-550 under hot water reflux to allow the amidation under stirring.

A highly-dispersed hydrogenation catalyst is provided, where the highly-dispersed hydrogenation catalyst is obtained by loading an active component on the aluminum oxide composite carrier described above through limited times of impregnation and roasting.

Preferably, the impregnation and roasting may be conducted 2 to 6 times, and loaded particles in the hydrogenation catalyst may have a particle size of 0.1 nm to 10 nm.

Preferably, the impregnation and roasting may be conducted once, loaded particles in the hydrogenation catalyst may have a particle size of 20 nm to 30 nm.

Preferably, the active component may include a main active metal component and synergistic component;
preferably, the main active metal component may be Ni; and
preferably, the synergistic component may be Mo and W.

A method for preparing a highly-dispersed hydrogenation catalyst is provided, including: loading an active component on the aluminum oxide composite carrier described above through multi-stage impregnation.

Preferably, the impregnation may be conducted n times; a proportion of the active component may be X; a staged impregnation solution may have a concentration of $Y_n$, and a sum of concentrations of impregnation solutions in all stages may be X;
$Y_n = X/n$; and
preferably, n may be 1 to 6.

Preferably, a staged impregnation may be conducted specifically as follows:
completely dissolving a metal salt of the active component in water to prepare a staged impregnation solution, adding the staged impregnation solution to the carrier, and thoroughly stirring for impregnation; and drying and roasting an impregnated solid material to form a staged catalyst;
where a product obtained after the last impregnation is the highly-dispersed hydrogenation catalyst; and
preferably, the impregnation may be conducted under vacuum reflux.

Use of the highly-dispersed hydrogenation catalyst described above in the preparation of a biofuel from palm oil, methyl-esterified palm oil, a waste fatty acid, or genetically modified soybean oil through HDO is provided.

The present disclosure has the following advantages and beneficial effects:

1. An aluminum oxide-titanium dioxide/zirconium dioxide composite with regular pores is adopted as a carrier. The modified aluminum oxide carrier can improve the hydrothermal stability and catalytic efficiency of a catalyst, and can also enhance the binding between an active component and the carrier, thereby increasing a life of a catalyst.

2. The metal active component in the highly-dispersed hydrogenation catalyst is in a nano-scale distribution, the number of hydrogenation active sites of the catalyst is significantly increased, and the dispersion is also increased correspondingly, thereby increasing the life, HDO activity, and catalytic efficiency of the catalyst.

3. Through a special impregnation process, the dispersion of the active metal component is successfully improved and the particle size is at the nano-scale, which increases the number of active sites and the HDO activity. In addition, the modification of the carrier makes the catalyst have improved hydrothermal stability. Therefore, it is possible to successfully prepare a bio-jet fuel catalyst with high HDO activity and long life, and a bio jet fuel meeting ASTM D7566 standards can be prepared efficiently using the highly-dispersed hydrogenation catalyst with high activity.

DETAILED DESCRIPTION OF THE EMBODIMENTS

Figure 1:
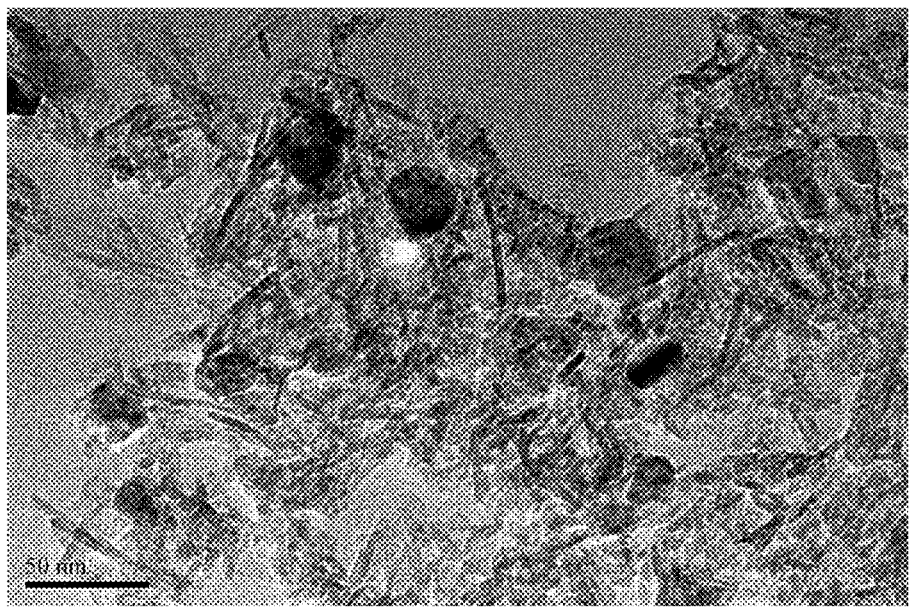
FIG. 1 is a TEM image of NiMoW/$\gamma$-$Al_2O_3$—$TiO_2$ (10%) in Example 2.

The present disclosure relates to a highly-dispersed hydrogenation catalyst, a preparation method thereof, and use thereof in the preparation of a biofuel from palm oil or other oil. In the prepared hydrogenation catalyst, a metal active component is loaded on a carrier with extremely high dispersion and nano-scale particle size, which increases the number of active sites and improves the HDO activity of the catalyst. In the present disclosure, the traditional aluminum oxide carrier is modified, where MA-grafted PP (MA-PP) is introduced to prepare an aluminum oxide composite carrier with regular pores, which improves the binding of the active component and the carrier to a great extent, such that the hydrothermal stability of the catalyst is improved and the service life of the catalyst is increased. The catalyst with high HDO activity, high stability, and long life is of great significance in the preparation of a biofuel from a vegetable oil through HDO. In the catalyst, modified aluminum oxide is adopted as a carrier, Ni is adopted as a main active metal, and Mo and W are adopted as a synergistic component. The synergistic component is used as an additive to improve the dispersion of the active component, which also has corresponding hydrogenation activity.

The modified aluminum oxide is specifically an aluminum oxide-titanium dioxide carrier or an aluminum oxide-zirconium dioxide carrier. A preparation method is specifically as follows: 1% to 5% of KH-550 is added to ethanol, and a resulting mixture is stirred for 0.5 h; 1% to 5% of MA-PP is added under reflux at 80° C., and a resulting mixture is stirred for 12 h to allow amidation; γ-Al$_2$O$_3$ and TBT are added, and a resulting mixture is further stirred for 1 h to 3 h; and a resulting mixture is filtered to obtain a solid material, and the solid material is washed to neutrality, and then dried and roasted to form the aluminum oxide-titanium dioxide carrier, where a mass percentage of the titanium dioxide in the carrier is 5% to 20%. If the TBT is replaced by TBZ, the aluminum oxide-zirconium dioxide carrier is formed after the drying and roasting, where a mass percentage of the zirconium dioxide in the carrier is 5% to 20%. The composite carrier obtained after the roasting has regular pores and uniform binding, and thus can improve the hydrothermal stability of the catalyst, thereby increasing the life span. Through experiments, it is found that an aluminum oxide-titanium dioxide carrier with 10% of titanium dioxide has the optimal stability; and the aluminum oxide-zirconium dioxide carrier with 15% of zirconium dioxide has the optimal stability.

For example, the aluminum oxide-titanium dioxide carrier with 10% of titanium dioxide is prepared through the following specific steps: 100 ml of ethanol and 5 g of KH-550 are added to a three-necked flask and stirred for 0.5 h; then 5 g of MA-PP is added under reflux at 80° C., and a resulting mixture is stirred for 12 h to allow amidation; 20 g of γ-Al$_2$O$_3$ is added, and a resulting mixture is stirred for 1 h to form a uniform γ-Al$_2$O$_3$ suspension in which γ-Al$_2$O$_3$ is uniformly dispersed in the solvent; then 9.57 g of TBT is added dropwise to the γ-Al$_2$O$_3$ suspension, and a resulting mixture is further stirred for 2 h; and a resulting mixture is subjected to suction filtration to obtain a solid, and the solid is dried at 120° C. for 2 h and roasted at 500° C. for 2 h to obtain the aluminum oxide-titanium dioxide (10%) carrier. For example, an aluminum oxide-zirconium dioxide carrier with 20% of zirconium dioxide is prepared through the following specific steps: 100 ml of ethanol and 5 g of KH-550 are added to a three-necked flask and stirred for 0.5 h; then 5 g of MA-PP is added under reflux at 80° C., and a resulting mixture is stirred for 12 h to allow amidation; 20 g of γ-Al$_2$O$_3$ is added, and a resulting mixture is stirred for 1 h to form a uniform γ-Al$_2$O$_3$ suspension in which γ-Al$_2$O$_3$ is uniformly dispersed in the solvent; then 6.91 g of TBZ is added to the γ-Al$_2$O$_3$ suspension, and a resulting mixture is further stirred for 2 h; and a resulting mixture is subjected to suction filtration to obtain a solid, and the solid is dried at 120° C. for 2 h and roasted at 500° C. for 2 h to obtain the aluminum oxide-zirconium dioxide (20%) carrier.

The active component in the catalyst may include a main active metal component and a synergistic component. A mass percentage of the main active metal component may be 5% to 30%. Through many experiments, it is found that, when the main active metal component is Ni, the catalyst has the optimal hydrogenation activity. A mass percentage of the synergistic component may be 1% to 5%, and the synergistic component can be one or more from the group consisting of Co, Mo, and W. Through many experiments, it is found that, when the synergistic component is Mo and W, the catalyst shows significantly-improved activity. Mo and W can synergistically serve as additives to improve the dispersion of the active component, which also have corresponding hydrogenation activity.

A catalyst is usually prepared through single impregnation, where an active component-containing impregnation solution with a customized concentration is prepared and thoroughly mixed with a carrier, and a resulting mixture is roasted to form the catalyst. For example, the catalyst NiMoW/γ-Al$_2$O$_3$ is prepared through ordinary physical impregnation: corresponding masses of a nickel salt, a molybdenum salt, and a tungsten salt are weighed and added to water with an equal volumetric water absorption ratio to a carrier, and a resulting mixture is fully stirred to form an impregnation solution; and the impregnation solution is then added to the corresponding carrier, and a resulting mixture is thoroughly mixed, allowed to stand, and then dried and roasted to form the catalyst.

In order to improve the uniformity of a mixture and the dispersion of the metal active component, a rotary evaporator is used to conduct the thorough mixing, and the impregnation and loading is conducted under vacuum reflux, which effectively improves the load dispersion of the active component. In a catalyst formed in this way, the metal active component is loaded at a metal particle loading level of 20 nm to 30 nm.

The present disclosure adopts a multi-stage impregnation and roasting process to prepare a catalyst. For example, the catalyst n-NiMoW/γ-Al$_2$O$_3$ is prepared through multi-stage physical impregnation and roasting as follows: when a proportion of a target metal component is X, the impregnation and roasting is conducted n times, and a metal salt solution prepared for each stage has a concentration of $Y_n$, $Y_1+Y_2+\ldots+Y_n=X$, where n is 2 to 6; a specified amount of a metal salt is weighed and dissolved in a corresponding amount of water to prepare a first-stage impregnation solution with a concentration of $Y_1$, the first-stage impregnation solution is added to a carrier, and a resulting mixture is thoroughly mixed, dried, and roasted to obtain a first-stage catalyst; then a second-stage impregnation solution with a concentration of $Y_2$ is prepared and added to the first-stage catalyst, and a resulting mixture is thoroughly mixed, dried, and roasted to obtain a second-stage catalyst; and the subsequent impregnation and roasting is conducted by the corresponding method, and a catalyst obtained after the last impregnation and roasting is the highly-dispersed hydrogenation catalyst.

The impregnation solutions in all stages can have the same concentration. When the impregnation solutions in all stages have the same concentration, the impregnation effect is prominent and the metal active component is evenly distributed. The impregnation can be conducted under vacuum reflux, for example, a rotary evaporator can be used, which can improve the loading efficiency and loading uniformity. Through multi-stage impregnation, the metal active component can be loaded on the carrier at a metal particle loading level of 1 nm to 10 nm, the dispersion of the active metal component is improved, and the particle size is at a nano-scale, thereby improving the number of active sites and the HDO activity.

The highly-dispersed hydrogenation catalyst is efficient when used in the preparation of a biofuel from a vegetable oil, exhibiting improved hydrothermal stability and long life. For example, the catalyst can be used in the preparation of a biofuel from palm oil or a waste fatty acid through hydrogenation.

Example 1: Catalyst NiMoW/$\gamma$-$Al_2O_3$ Prepared Through One-Time Impregnation A catalyst in which a mass percentage of a metal component was 25% was prepared, where Ni accounted for 20%, Mo accounted for 2.5%, and W accounted for 2.5%; and $\gamma$-$Al_2O_3$ was used as a carrier.

15 g of water with an equal volumetric water absorption ratio to 7.5 g of $\gamma$-$Al_2O_3$ was taken, 8.6 g of nickel acetate, 0.46 g of ammonium molybdate, and 0.37 g of ammonium metatungstate (AMT) were added to the water, and a resulting mixture was stirred for dissolution to prepare an impregnation solution; the impregnation solution was added dropwise to a petri dish with the 7.5 g of $\gamma$-$Al_2O_3$, and a resulting mixture was thoroughly mixed, allowed to stand for 12 h, dried at 120° C. for 3 h, and ground into a powder; and the powder was roasted at 500° C. for 2 h to obtain a powdery catalyst NiMoW/$\gamma$-$Al_2O_3$, and the powdery catalyst was tableted and sieved to obtain a 20 to 40-mesh tableted catalyst NiMoW/$\gamma$-$Al_2O_3$.

The catalyst NiMoW/$\gamma$-$Al_2O_3$ was used to prepare a biofuel from palm oil through hydrogenation, and specific steps were as follows:

(1) Pretreatment of the catalyst: The catalyst NiMoW/$\gamma$-$Al_2O_3$ was shaped and then placed in a fixed bed reactor, then the fixed bed reactor was purged at room temperature for 0.5 h with nitrogen at a volumetric space velocity of 500 $h^{-1}$ and then purged with hydrogen at an equal volumetric space velocity, and the catalyst was heated to 200° C. at a rate of 5° C./min, and then heated to 350° C. at a rate of 10° C./min and kept at the temperature for at least 3 h.

(2) HDO of the palm oil: At 350° C., based on a hydrogen-palm oil volume ratio of 800, a mixed solution of palm oil and cyclohexane (in a ratio of 3:2) was fed at a feed space velocity of 1 $h^{-1}$, during which a reaction solution was sampled every 1 h, and a liquid product was separated from water and subjected to a composition test.

The catalyst NiMoW/$\gamma$-$Al_2O_3$ was used to prepare a biofuel from a waste fatty acid through hydrogenation, and specific steps were as follows:

(1) Pretreatment of the catalyst: The catalyst NiMoW/$\gamma$-$Al_2O_3$ was shaped and then placed in a fixed bed reactor, then the fixed bed reactor was purged at room temperature for 0.5 h with nitrogen at a volumetric space velocity of 500 $h^{-1}$ and then purged with hydrogen at an equal volumetric space velocity, and the catalyst was heated to 200° C. at a rate of 5° C./min, and then heated to 350° C. at a rate of 10° C./min and kept at the temperature for at least 3 h.

(2) HDO of the waste fatty acid: At 350° C., based on a hydrogen-waste fatty acid volume ratio per unit time of 1,000, the waste fatty acid was fed at a feed space velocity of 1 h-1 under a reaction pressure of 3 MPa, during which a reaction solution was sampled every 1 h, and a liquid product was separated from water and subjected to a composition test.

Example 2: Catalyst NiMoW/$\gamma$-$Al_2O_3$—$TiO_2$/$ZrO_2$ Prepared Through One-Time Impregnation A catalyst in which a mass percentage of a metal component was 25% was prepared, where Ni accounted for 20%, Mo accounted for 2.5%, and W accounted for 2.5%; and $\gamma$-$Al_2O_3$—$TiO_2$/$ZrO_2$ was used as a carrier.

15 g of water with an equal volumetric water absorption ratio to 7.5 g of $\gamma$-$Al_2O_3$—$TiO_2$/$ZrO_2$ was taken, 8.6 g of nickel acetate, 0.46 g of ammonium molybdate, and 0.37 g of AMT were added to the water, and a resulting mixture was stirred for dissolution to prepare an impregnation solution; the impregnation solution was added dropwise to a petri dish with the 7.5 g of $\gamma$-$Al_2O_3$—$TiO_2$/$ZrO_2$, and a resulting mixture was thoroughly mixed, allowed to stand for 12 h, dried at 120° C. for 3 h, and ground into a powder; and the powder was roasted at 500° C. for 2 h to obtain a powdery catalyst NiMoW/$\gamma$-$Al_2O_3$—$TiO_2$/$ZrO_2$, and the powdery catalyst was tableted and sieved to obtain a 20 to 40-mesh tableted catalyst NiMoW/$\gamma$-$Al_2O_3$—$TiO_2$/$ZrO_2$.

The catalyst NiMoW/$\gamma$-$Al_2O_3$—$TiO_2$/$ZrO_2$ was used to prepare a biofuel from palm oil or a waste fatty acid through hydrogenation, and specific steps were as in Example 1.

Example 3: Catalyst 2-NiMoW/$\gamma$-$Al_2O_3$—$TiO_2$/$ZrO_2$ Prepared Through Two-Stage Impregnation A catalyst in which a mass percentage of a metal component was 25% was prepared, where Ni accounted for 20%, Mo accounted for 2.5%, and W accounted for 2.5%; and $\gamma$-$Al_2O_3$—$TiO_2$/$ZrO_2$ was used as a carrier.

4.3 g of nickel acetate, 0.23 g of ammonium molybdate, and 0.18 g of AMT were added to 200 ml of water, and a resulting mixture was stirred for dissolution to obtain a first-stage impregnation solution; the first-stage impregnation solution was added to a rotary evaporator with 10.41 g of the $\gamma$-$Al_2O_3$—$TiO_2$/$ZrO_2$ carrier, vacuum-pumping was conducted, and then stirring was conducted under reflux at 100° C. for 2 h; and a resulting solution was dried at 120° C., and then roasted at 500° C. for 2 h in a muffle furnace to obtain a powder, which was a first-stage catalyst.

4.3 g of nickel acetate, 0.23 g of ammonium molybdate, and 0.19 g of AMT were added to 200 ml of water, and a resulting mixture was stirred for dissolution to obtain a second-stage impregnation solution; the second-stage impregnation solution was added to a rotary evaporator with the first-stage catalyst, vacuum-pumping was conducted, and then stirring was conducted under reflux at 100° C. for 2 h; a resulting solution was dried at 120° C., and then roasted at 500° C. for 2 h in a muffle furnace to obtain a powder, which was a second-stage catalyst (namely, 2-Ni- MoW/γ-Al$_2$O$_3$—TiO$_2$/ZrO$_2$); and the powdery catalyst was tabletted and sieved to obtain 20 to 40-mesh tabletted 2-Ni-MoW/γ-Al$_2$O$_3$—TiO$_2$/ZrO$_2$.

The catalyst 2-NiMoW/γ-Al$_2$O$_3$—TiO$_2$/ZrO$_2$ was used to prepare a biofuel from palm oil or a waste fatty acid through hydrogenation, and specific steps were as in Example 1.

Example 4: Catalyst 3-NiMoW/γ-Al$_2$O$_3$ Prepared Through Three-Stage Impregnation A catalyst in which a mass percentage of a metal component was 25% was prepared, where Ni accounted for 20%, Mo accounted for 2.5%, and W accounted for 2.5%; and γ-Al$_2$O$_3$ was used as a carrier.

4 g of nickel acetate, 0.3 g of ammonium molybdate, and 0.2 g of AMT were added to 200 ml of water, and a resulting mixture was stirred for dissolution to obtain a first-stage impregnation solution; the first-stage impregnation solution was added to a rotary evaporator with 10.41 g of the γ-Al$_2$O$_3$ carrier, vacuum-pumping was conducted, and then stirring was conducted under reflux at 100° C. for 2 h; and a resulting solution was dried at 120° C., and then roasted at 500° C. for 2 h in a muffle furnace to obtain a powder, which was a first-stage catalyst.

2.3 g of nickel acetate, 0.08 g of ammonium molybdate, and 0.08 g of AMT were added to 200 ml of water, and a resulting mixture was stirred for dissolution to obtain a second-stage impregnation solution; the second-stage impregnation solution was added to a rotary evaporator with the first-stage catalyst, vacuum-pumping was conducted, and then stirring was conducted under reflux at 100° C. for 2 h; and a resulting solution was dried at 120° C., and then roasted at 500° C. for 2 h in a muffle furnace to obtain a powder, which was a second-stage catalyst.

2.3 g of nickel acetate, 0.08 g of ammonium molybdate, and 0.09 g of AMT were added to 200 ml of water, and a resulting mixture was stirred for dissolution to obtain a third-stage impregnation solution; the third-stage impregnation solution was added to a rotary evaporator with the second-stage catalyst, vacuum-pumping was conducted, and then stirring was conducted under reflux at 100° C. for 2 h; a resulting solution was dried at 120° C., and then roasted at 500° C. for 2 h in a muffle furnace to obtain a powder, which was a third-stage catalyst (namely, 3-NiMoW/γ-Al$_2$O$_3$); and the powdery catalyst was tabletted and sieved to obtain 20 to 40-mesh tabletted 3-NiMoW/γ-Al$_2$O$_3$.

The catalyst 3-NiMoW/γ-Al$_2$O$_3$ was used to prepare a biofuel from palm oil or a waste fatty acid through hydrogenation, and specific steps were as in Example 1.

Example 5: Catalyst 3-NiMoW/γ-Al$_2$O$_3$—TiO$_2$/ZrO$_2$ Prepared Through Three-Stage Impregnation A catalyst in which a mass percentage of a metal component was 25% was prepared, where Ni accounted for 20%, Mo accounted for 2.5%, and W accounted for 2.5%; and γ-Al$_2$O$_3$—TiO$_2$/ZrO$_2$ was used as a carrier.

2.9 g of nickel acetate, 0.16 g of ammonium molybdate, and 0.13 g of AMT were added to 200 ml of water, and a resulting mixture was stirred for dissolution to obtain a first-stage impregnation solution; the first-stage impregnation solution was added to a rotary evaporator with 10.41 g of the γ-Al$_2$O$_3$—TiO$_2$/ZrO$_2$ carrier, vacuum-pumping was conducted, and then stirring was conducted under reflux at 100° C. for 2 h; and a resulting solution was dried at 120° C., and then roasted at 500° C. for 2 h in a muffle furnace to obtain a powder, which was a first-stage catalyst.

2.9 g of nickel acetate, 0.15 g of ammonium molybdate, and 0.12 g of AMT were added to 200 ml of water, and a resulting mixture was stirred for dissolution to obtain a second-stage impregnation solution; the second-stage impregnation solution was added to a rotary evaporator with the first-stage catalyst, vacuum-pumping was conducted, and then stirring was conducted under reflux at 100° C. for 2 h; and a resulting solution was dried at 120° C., and then roasted at 500° C. for 2 h in a muffle furnace to obtain a powder, which was a second-stage catalyst.

2.8 g of nickel acetate, 0.15 g of ammonium molybdate, and 0.12 g of AMT were added to 200 ml of water, and a resulting mixture was stirred for dissolution to obtain a third-stage impregnation solution; the third-stage impregnation solution was added to a rotary evaporator with the second-stage catalyst, vacuum-pumping was conducted, and then stirring was conducted under reflux at 100° C. for 2 h; a resulting solution was dried at 120° C., and then roasted at 500° C. for 2 h in a muffle furnace to obtain a powder, which was a third-stage catalyst (namely, 3-NiMoW/γ-Al$_2$O$_3$—TiO$_2$/ZrO$_2$); and the powdery catalyst was tabletted and sieved to obtain 20 to 40-mesh tabletted 3-NiMoW/γ-Al$_2$O$_3$—TiO$_2$/ZrO$_2$.

The catalyst 3-NiMoW/γ-Al$_2$O$_3$—TiO$_2$/ZrO$_2$ was used to prepare a biofuel from palm oil, methyl-esterified palm oil, a waste fatty acid, or genetically modified soybean oil through hydrogenation, and specific steps were as in Example 1. HDO steps of the methyl-esterified palm oil and the genetically modified soybean oil were the same as that of the palm oil.

Example 6: Catalyst 6-NiMoW/γ-Al$_2$O$_3$—TiO$_2$/ZrO$_2$ Prepared Through Six-Stage Impregnation A catalyst in which a mass percentage of a metal component was 25% was prepared, where Ni accounted for 20%, Mo accounted for 2.5%, and W accounted for 2.5%; and γ-Al$_2$O$_3$—TiO$_2$/ZrO$_2$ was used as a carrier.

1.45 g of nickel acetate, 0.08 g of ammonium molybdate, and 0.07 g of AMT were added to 200 ml of water, and a resulting mixture was stirred for dissolution to obtain a first-stage impregnation solution; the first-stage impregnation solution was added to a rotary evaporator with 10.41 g of the γ-Al$_2$O$_3$—TiO$_2$/ZrO$_2$ carrier, vacuum-pumping was conducted, and then stirring was conducted under reflux at 100° C. for 2 h; and a resulting solution was dried at 120° C., and then roasted at 500° C. for 2 h in a muffle furnace to obtain a powder, which was a first-stage catalyst.

1.43 g of nickel acetate, 0.08 g of ammonium molybdate, and 0.06 g of AMT were added to 200 ml of water, and a resulting mixture was stirred for dissolution to obtain a second-stage impregnation solution; the second-stage impregnation solution was added to a rotary evaporator with the first-stage catalyst, vacuum-pumping was conducted, and then stirring was conducted under reflux at 100° C. for 2 h; and a resulting solution was dried at 120° C., and then roasted at 500° C. for 2 h in a muffle furnace to obtain a powder, which was a second-stage catalyst.

1.43 g of nickel acetate, 0.08 g of ammonium molybdate, and 0.06 g of AMT were added to 200 ml of water, and a resulting mixture was stirred for dissolution to obtain a third-stage impregnation solution; the third-stage impregnation solution was added to a rotary evaporator with the second-stage catalyst, vacuum-pumping was conducted, and then stirring was conducted under reflux at 100° C. for 2 h; and a resulting solution was dried at 120° C., and then roasted at 500° C. for 2 h in a muffle furnace to obtain a powder, which was a third-stage catalyst.

1.43 g of nickel acetate, 0.08 g of ammonium molybdate, and 0.06 g of AMT were added to 200 ml of water, and a resulting mixture was stirred for dissolution to obtain a fourth-stage impregnation solution; the fourth-stage impregnation solution was added to a rotary evaporator with the third-stage catalyst, vacuum-pumping was conducted, and then stirring was conducted under reflux at 100° C. for 2 h; and a resulting solution was dried at 120° C., and then roasted at 500° C. for 2 h in a muffle furnace to obtain a powder, which was a fourth-stage catalyst.

1.43 g of nickel acetate, 0.08 g of ammonium molybdate, and 0.06 g of AMT were added to 200 ml of water, and a resulting mixture was stirred for dissolution to obtain a fifth-stage impregnation solution; the fifth-stage impregnation solution was added to a rotary evaporator with the fourth-stage catalyst, vacuum-pumping was conducted, and then stirring was conducted under reflux at 100° C. for 2 h; and a resulting solution was dried at 120° C., and then roasted at 500° C. for 2 h in a muffle furnace to obtain a powder, which was a fifth-stage catalyst.

1.43 g of nickel acetate, 0.06 g of ammonium molybdate, and 0.06 g of AMT were added to 200 ml of water, and a resulting mixture was stirred for dissolution to obtain a sixth-stage impregnation solution; the sixth-stage impregnation solution was added to a rotary evaporator with the fifth-stage catalyst, vacuum-pumping was conducted, and then stirring was conducted under reflux at 100° C. for 2 h; a resulting solution was dried at 120° C., and then roasted at 500° C. for 2 h in a muffle furnace to obtain a powder, which was a sixth-stage catalyst (namely, 6-NiMoW/$\gamma$-Al$_2$O$_3$—TiO$_2$/ZrO$_2$); and the powdery catalyst was tableted and sieved to obtain 20 to 40-mesh tableted 6-NiMoW/$\gamma$-Al$_2$O$_3$—TiO$_2$/ZrO$_2$.

The catalyst 6-NiMoW/$\gamma$-Al$_2$O$_3$—TiO$_2$/ZrO$_2$ was used to prepare a biofuel from palm oil or a waste fatty acid through hydrogenation, and specific steps were as in Example 1.

Example 7: Catalyst 3-O—NiMoW/$\gamma$-Al$_2$O$_3$—TiO$_2$/ZrO$_2$ Prepared Through Three-Stage Impregnation (without Roasting)

A catalyst in which a mass percentage of a metal component was 25% was prepared, where Ni accounted for 20%, Mo accounted for 2.5%, and W accounted for 2.5%; and $\gamma$-Al$_2$O$_3$—TiO$_2$/ZrO$_2$ was used as a carrier.

2.9 g of nickel acetate, 0.16 g of ammonium molybdate, and 0.13 g of AMT were added to 200 ml of water, and a resulting mixture was stirred for dissolution to obtain a first-stage impregnation solution; the first-stage impregnation solution was added to a rotary evaporator with 10.41 g of the $\gamma$-Al$_2$O$_3$—TiO$_2$/ZrO$_2$ carrier, vacuum-pumping was conducted, and then stirring was conducted under reflux at 100° C. for 2 h; and a resulting solution was dried at 120° C. to obtain a powder, which was a first-stage catalyst (without roasting).

2.9 g of nickel acetate, 0.15 g of ammonium molybdate, and 0.12 g of AMT were added to 200 ml of water, and a resulting mixture was stirred for dissolution to obtain a second-stage impregnation solution; the second-stage impregnation solution was added to a rotary evaporator with the first-stage catalyst, vacuum-pumping was conducted, and then stirring was conducted under reflux at 100° C. for 2 h; and a resulting solution was dried at 120° C. to obtain a powder, which was a second-stage catalyst (without roasting).

2.8 g of nickel acetate, 0.15 g of ammonium molybdate, and 0.12 g of AMT were added to 200 ml of water, and a resulting mixture was stirred for dissolution to obtain a third-stage impregnation solution; the third-stage impregnation solution was added to a rotary evaporator with the second-stage catalyst, vacuum-pumping was conducted, and then stirring was conducted under reflux at 100° C. for 2 h; a resulting solution was dried at 120° C. to obtain a powder, which was a third-stage catalyst (without roasting); the third-stage catalyst (without roasting) was roasted at 500° C. for 2 h in a muffle furnace to obtain a powder, which was 3-0-NiMoW/$\gamma$-Al$_2$O$_3$—TiO$_2$/ZrO$_2$; and the powdery catalyst was tableted and sieved to obtain 20 to 40-mesh tableted 3-0-NiMoW/$\gamma$-Al$_2$O$_3$—TiO$_2$/ZrO$_2$.

The catalyst 3-0-NiMoW/$\gamma$-Al$_2$O$_3$—TiO$_2$/ZrO$_2$ was used to prepare a biodiesel from palm oil or a waste fatty acid through hydrogenation, and specific steps were as in Example 1.

Figure 2:
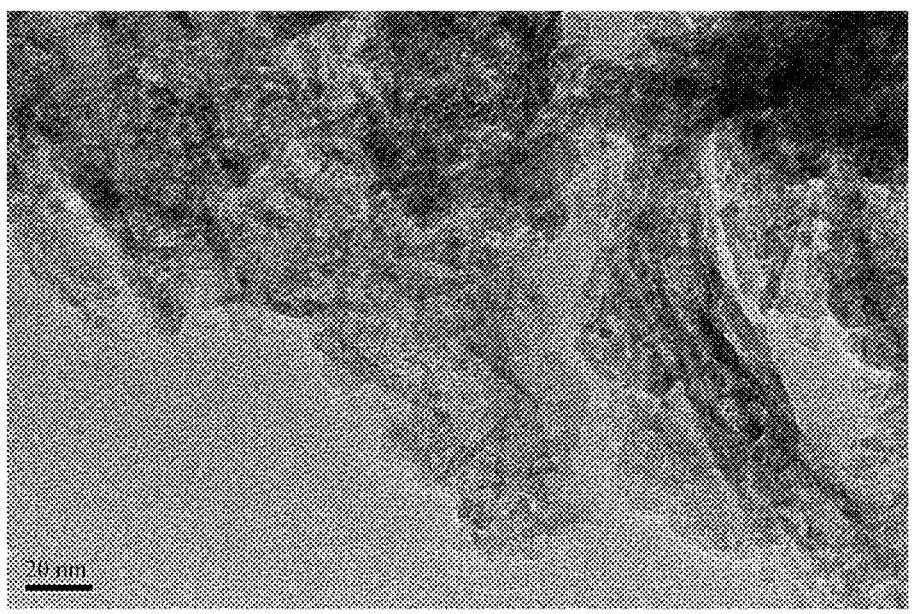
FIG. 2 is a TEM image of 2-NiMoW/γ-Al$_2$O$_3$—TiO$_2$ (10%) in Example 3.
Figure 3:
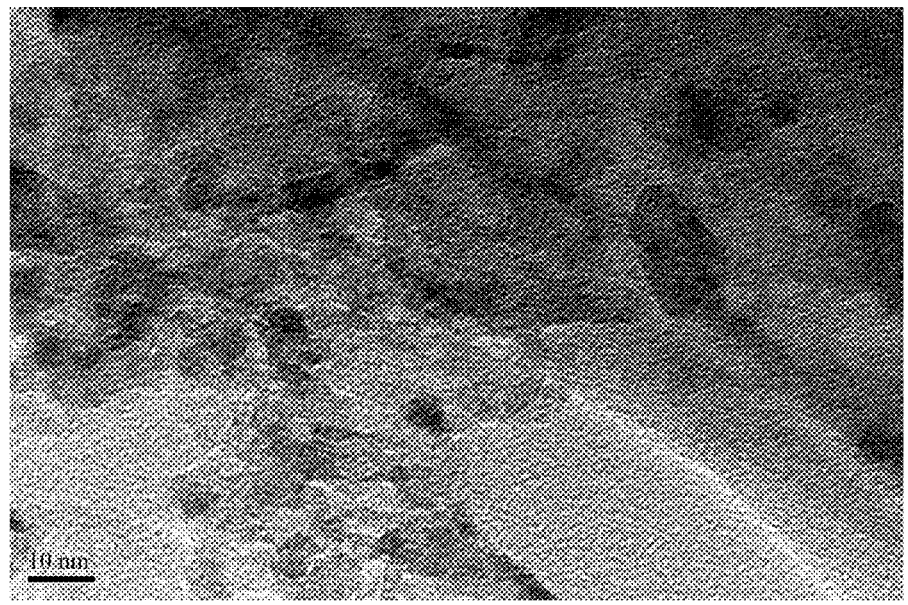
FIG. 3 is a TEM image of 3-NiMoW/γ-Al$_2$O$_3$—TiO$_2$ (10%) in Example 5.
Figure 4:
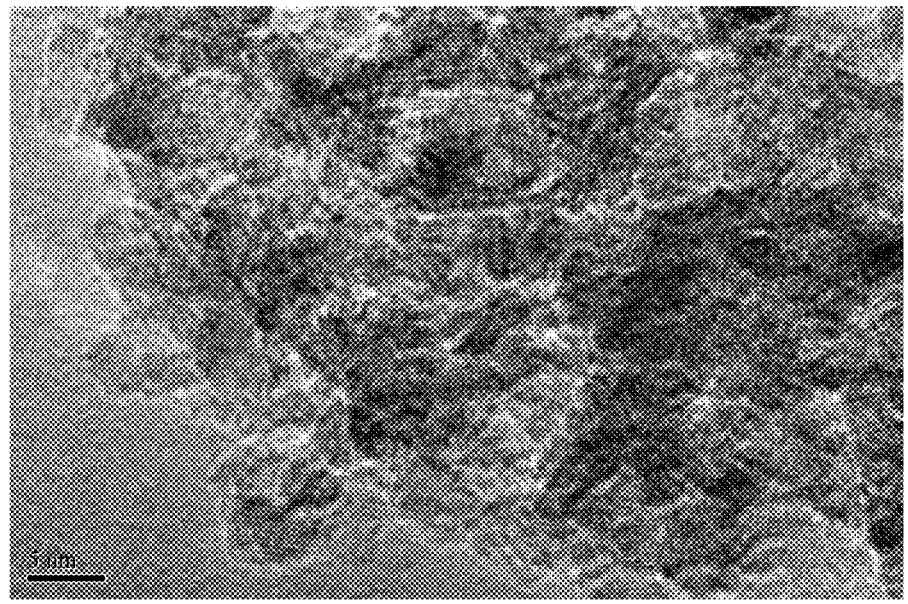
FIG. 4 is a TEM image of 6-NiMoW/γ-Al$_2$O$_3$—TiO$_2$ (10%) in Example 6.

FIG. 1 is a TEM image of NiMoW/$\gamma$-Al$_2$O$_3$—TiO$_2$ (10%) in Example 2; FIG. 2 is a TEM image of 2-NiMoW/$\gamma$-Al$_2$O$_3$—TiO$_2$ (10%) in Example 3; FIG. 3 is a TEM image of 3-NiMoW/$\gamma$-Al$_2$O$_3$—TiO$_2$ (10%) in Example 5; and FIG. 4 is a TEM image of 6-NiMoW/$\gamma$-Al$_2$O$_3$—TiO$_2$ (10%) in Example 6. From the comparison of the four figures, it can be clearly seen that, for the titanium dioxide-modified catalysts obtained through different times of impregnation, the particle size of the loaded metal active component gradually decreases with the increase of the number of impregnation times, and is reduced to a nano-scale or smaller when the impregnation is conducted four times; and as the particle size decreases, both the dispersion of the active component and the number of active sites increase. As measured, when the impregnation is conducted once, a size of loaded metal particles is 20 nm to 30 nm; when the impregnation is conducted 2 times, a size of loaded metal particles is 5 nm to 10 nm; when the impregnation is conducted 3 times, a size of loaded metal particles can reach 3 nm to 5 nm; and when the impregnation is conducted 4 to 6 times, a size of loaded metal particles can reach 0.1 nm to 3 nm.

Catalytic results of the catalysts of the examples in the preparation of a biodiesel from palm oil or a waste fatty acid through hydrogenation are shown in Tables 1 to 6.

TABLE 1

Catalytic results of the catalysts prepared using 10% titanium dioxide-modified aluminum oxide as a carrier through different times of impregnation in HDO of palm oil

| Catalyst | Temp (° C.) | LHSV (hr$^{-1}$) | C5-C7 (%) | C8-C14 (%) | C15-C18 (%) | C17/C18 |
|---|---|---|---|---|---|---|
| NiMoW/ $\gamma$-Al$_2$O$_3$—TiO$_2$ | 350 | 1 | 2.6 | 7.7 | 89.6 | 1.9 |
| | | 0.5 | 2.9 | 9.8 | 87.3 | 1.5 |
| | 330 | 1 | 1.5 | 4.6 | 93.9 | 2.5 |
| | | 0.5 | 0.9 | 4.7 | 94.4 | 1.6 |
| | 310 | 0.5 | 0.8 | 3.2 | 96.0 | 2.2 |
| 2-NiMoW/ $\gamma$-Al$_2$O$_3$—TiO$_2$ | 350 | 1 | 3.0 | 7.9 | 89.1 | 4.7 |
| | | 0.5 | 3.6 | 12.3 | 84.1 | 3.9 |
| | 330 | 1 | 1.6 | 4.9 | 93.5 | 4.7 |
| | | 0.5 | 2.0 | 7.2 | 90.8 | 4.6 |
| | 310 | 1 | 1.0 | 3.0 | 96.0 | 5.1 |
| | | 0.5 | 1.1 | 4.4 | 94.5 | 5.2 |
| 3-NiMoW/ $\gamma$-Al$_2$O$_3$—TiO$_2$ | 350 | 1 | 3.4 | 10.0 | 86.5 | 5.8 |
| | | 0.5 | 4.6 | 14.4 | 81.0 | 5.6 |
| | 330 | 1 | 1.7 | 4.9 | 93.4 | 5.5 |
| | | 0.5 | 2.2 | 7.0 | 90.8 | 5.4 |
| | 310 | 1 | 1.0 | 2.7 | 96.2 | 5.2 |
| | | 0.5 | 1.3 | 4.1 | 94.7 | 5.3 |

TABLE 1-continued

Catalytic results of the catalysts prepared using 10% titanium dioxide-modified aluminum oxide as a carrier through different times of impregnation in HDO of palm oil

| Catalyst | Temp (° C.) | LHSV (hr$^{-1}$) | C5-C7 (%) | C8-C14 (%) | C15-C18 (%) | C17/C18 |
|---|---|---|---|---|---|---|
| 6-NiMoW/ γ-Al$_2$O$_3$—TiO$_2$ | 350 | 1 | 3.4 | 14.1 | 82.5 | 5.8 |
| | | 0.5 | 4.5 | 17.5 | 78.0 | 5.6 |
| | 330 | 1 | 1.9 | 5.3 | 92.8 | 5.5 |
| | | 0.5 | 2.6 | 8.1 | 89.3 | 5.5 |
| | 310 | 1 | 1.1 | 3.1 | 95.7 | 5.6 |
| | | 0.5 | 1.1 | 3.6 | 95.3 | 5.3 |

TABLE 2

Catalytic results of the catalysts prepared using 15% zirconium dioxide-modified aluminum oxide as a carrier through different times of impregnation in HDO of palm oil

| Catalyst | Temp (° C.) | LHSV (hr$^{-1}$) | C5-C7 (%) | C8-C14 (%) | C15-C18 (%) | C17/C18 |
|---|---|---|---|---|---|---|
| NiMoW/ γ-Al$_2$O$_3$—ZrO$_2$ | 350 | 1 | 2.9 | 8.1 | 89.0 | 4.3 |
| | 330 | 1 | 1.9 | 5.3 | 92.8 | 3.1 |
| | 310 | 1 | 1.0 | 2.5 | 96.5 | 2.7 |
| 2-NiMoW/ γ-Al$_2$O$_3$—ZrO$_2$ | 350 | 1 | 2.2 | 4.6 | 93.2 | 5.6 |
| | 330 | 1 | 2.1 | 4.3 | 93.6 | 4.1 |
| | 310 | 1 | 4.7 | 3.5 | 91.8 | 3.7 |
| 3-NiMoW/ γ-Al$_2$O$_3$—ZrO$_2$ | 350 | 1 | 3.4 | 3.6 | 93.0 | 6.8 |
| | 330 | 1 | 4.2 | 3.3 | 92.5 | 5.1 |
| | 310 | 1 | 5.5 | 3.2 | 91.3 | 4.7 |
| 6-NiMoW/ γ-Al$_2$O$_3$—ZrO$_2$ | 350 | 1 | 0.8 | 4.6 | 94.6 | 7.2 |
| | 330 | 1 | 2.3 | 4.3 | 93.0 | 5.8 |
| | 310 | 1 | 4.6 | 3.8 | 91.6 | 5.0 |

TABLE 3

Catalytic results of the catalysts in HDO of palm oil

| Catalyst | Temp (° C.) | LHSV (hr$^{-1}$) | C5-C7 (%) | C8-C14 (%) | C15-C18 (%) | C17/C18 |
|---|---|---|---|---|---|---|
| NiMoW/ γ-Al$_2$O$_3$ | 350 | 1 | 3 | 17.1 | 79.9 | 1.6 |
| | 330 | 1 | 1.4 | 7 | 91.6 | 1.7 |
| | 310 | 1 | There is a yellow precipitate in product, indicating incomplete conversion | | | |
| 3-NiMoW/ γ-Al$_2$O$_3$ | 350 | 1 | 3 | 19.8 | 77.2 | 2.3 |
| | 330 | 1 | 1.4 | 7.2 | 91.4 | 2.1 |
| | 310 | 1 | There is a yellow precipitate in product, indicating incomplete conversion | | | |
| 3-NiMoW/ γ-Al$_2$O$_3$—ZrO$_2$ | 350 | 1 | 3.4 | 3.6 | 93.0 | 6.8 |
| | 330 | 1 | 4.2 | 3.3 | 92.5 | 5.1 |
| | 310 | 1 | 5.5 | 3.2 | 91.3 | 4.7 |
| 3-0-NiMoW/ γ-Al$_2$O$_3$—TiO$_2$ | 350 | 1 | 2.6 | 8.1 | 89.3 | 2.6 |
| | 330 | 1 | 1.6 | 5.6 | 92.8 | 2.0 |
| | 310 | 1 | 1.1 | 2.6 | 96.3 | 1.6 |
| 3-0-NiMoW/ γ-Al$_2$O$_3$—ZrO$_2$ | 350 | 1 | 2.0 | 4.4 | 93.6 | 2.4 |
| | 330 | 1 | 1.6 | 4.0 | 94.4 | 2.1 |
| | 310 | 1 | 1.2 | 3.8 | 95.0 | 1.9 |

TABLE 4

Catalytic results of the catalysts prepared using 10% titanium dioxide-modified aluminum oxide as a carrier through different times of impregnation in HDO of a waste fatty acid

| Catalyst | Temp (° C.) | LHSV (hr$^{-1}$) | C5-C7 (%) | C8-C14 (%) | C15-C18 (%) | C17/C18 |
|---|---|---|---|---|---|---|
| NiMoW/ γ-Al$_2$O$_3$—TiO$_2$ | 350 | 1 | 2.5 | 7.6 | 89.8 | 1.8 |
| | | 0.5 | 2.8 | 9.7 | 87.5 | 1.4 |
| | 330 | 1 | 1.4 | 4.5 | 94.1 | 2.3 |
| | | 0.5 | 0.8 | 4.6 | 94.6 | 1.5 |
| | 310 | 0.5 | 0.6 | 3.0 | 96.4 | 2.0 |
| 2-NiMoW/ γ-Al$_2$O$_3$—TiO$_2$ | 350 | 1 | 3.2 | 7.9 | 88.9 | 4.6 |
| | | 0.5 | 3.3 | 12.0 | 84.1 | 3.5 |
| | 330 | 1 | 1.5 | 4.8 | 93.5 | 4.3 |
| | | 0.5 | 2.1 | 7.1 | 90.8 | 4.2 |
| | 310 | 1 | 1.1 | 3.1 | 95.8 | 5.5 |
| | | 0.5 | 1.0 | 4.5 | 94.5 | 5.3 |
| 3-NiMoW/ γ-Al$_2$O$_3$—TiO$_2$ | 350 | 1 | 3.2 | 10.5 | 86.0 | 6.3 |
| | | 0.5 | 4.6 | 14.4 | 81.0 | 6.5 |
| | 330 | 1 | 1.7 | 4.9 | 93.4 | 6.3 |
| | | 0.5 | 2.2 | 7.0 | 90.8 | 5.9 |
| | 310 | 1 | 1.0 | 2.7 | 96.2 | 5.4 |
| | | 0.5 | 1.3 | 4.1 | 94.7 | 5.2 |
| 6-NiMoW/ γ-Al$_2$O$_3$—TiO$_2$ | 350 | 1 | 3.2 | 14.0 | 82.8 | 5.9 |
| | | 0.5 | 4.2 | 17.3 | 78.5 | 5.8 |
| | 330 | 1 | 1.4 | 5.3 | 92.6 | 5.7 |
| | | 0.5 | 2.5 | 8.1 | 89.0 | 5.6 |
| | 310 | 1 | 1.6 | 3.1 | 95.2 | 5.5 |
| | | 0.5 | 1.3 | 3.6 | 95.2 | 5.3 |

TABLE 5

Catalytic results of the catalysts prepared using 15% zirconium dioxide-modified aluminum oxide as a carrier through different times of impregnation in HDO of a waste fatty acid

| Catalyst | Temp (° C.) | LHSV (hr$^{-1}$) | C5-C7 (%) | C8-C14 (%) | C15-C18 (%) | C17/C18 |
|---|---|---|---|---|---|---|
| NiMoW/ γ-Al$_2$O$_3$—ZrO$_2$ | 350 | 1 | 2.8 | 8.1 | 89.0 | 4.2 |
| | 330 | 1 | 1.6 | 5.3 | 92.8 | 3.0 |
| | 310 | 1 | 1.0 | 2.4 | 96.5 | 2.5 |
| 2-NiMoW/ γ-Al$_2$O$_3$—ZrO$_2$ | 350 | 1 | 2.5 | 4.6 | 93.2 | 5.6 |
| | 330 | 1 | 2.1 | 4.5 | 93.6 | 4.1 |
| | 310 | 1 | 4.7 | 3.3 | 91.8 | 3.7 |
| 3-NiMoW/ γ-Al$_2$O$_3$—ZrO$_2$ | 350 | 1 | 3.4 | 3.6 | 93.0 | 6.7 |
| | 330 | 1 | 4.2 | 3.4 | 92.5 | 5.2 |
| | 310 | 1 | 5.5 | 3.2 | 91.0 | 4.3 |
| 6-NiMoW/ γ-Al$_2$O$_3$—ZrO$_2$ | 350 | 1 | 0.4 | 4.2 | 94.6 | 7.0 |
| | 330 | 1 | 2.3 | 4.6 | 93.0 | 5.6 |
| | 310 | 1 | 4.6 | 3.8 | 91.5 | 5.1 |

TABLE 6

Catalytic results of the catalysts in HDO of a waste fatty acid

| Catalyst | Temp (° C.) | LHSV (hr$^{-1}$) | C5-C7 (%) | C8-C14 (%) | C15-C18 (%) | C17/C18 |
|---|---|---|---|---|---|---|
| NiMoW/ γ-Al$_2$O$_3$ | 350 | 1 | 3.2 | 17.1 | 79.9 | 1.4 |
| | 330 | 1 | 1.5 | 7 | 91.6 | 1.5 |
| | 310 | 1 | There is a yellow precipitate in product, indicating incomplete conversion | | | |
| 3-NiMoW/ γ-Al$_2$O$_3$ | 350 | 1 | 3 | 19.6 | 77.2 | 2.0 |
| | 330 | 1 | 1.2 | 7.2 | 91.4 | 1.9 |
| | 310 | 1 | There is a yellow precipitate in product, indicating incomplete conversion | | | |
| 3-NiMoW/ γ-Al$_2$O$_3$—ZrO$_2$ | 350 | 1 | 3.4 | 3.6 | 93.0 | 6.5 |
| | 330 | 1 | 4.2 | 3.2 | 92.5 | 5.2 |
| | 310 | 1 | 5.5 | 3.2 | 91.3 | 4.4 |
| 3-0-NiMoW/ γ-Al$_2$O$_3$—TiO$_2$ | 350 | 1 | 2.6 | 8.0 | 89.3 | 2.4 |
| | 330 | 1 | 1.6 | 5.4 | 92.8 | 2.1 |
| | 310 | 1 | 1.1 | 2.6 | 96.2 | 2.0 |

TABLE 6-continued

Catalytic results of the catalysts in HDO of a waste fatty acid

| Catalyst | Temp (° C.) | LHSV (hr⁻¹) | C5-C7 (%) | C8-C14 (%) | C15-C18 (%) | C17/C18 |
|---|---|---|---|---|---|---|
| 3-0-NiMoW/ | 350 | 1 | 2.1 | 4.4 | 93.5 | 2.5 |
| γ-Al₂O₃—ZrO₂ | 330 | 1 | 1.6 | 4.5 | 94.4 | 2.2 |
|  | 310 | 1 | 1.2 | 3.8 | 95.1 | 2.2 |

TABLE 7

Catalytic results of the catalyst 3-NiMoW/γ-Al₂O₃—TiO₂ in HDO of palm oil, methyl-esterified palm oil, a waste fatty acid, and genetically modified soybean oil

| Oil category | Temp (° C.) | LHSV (hr⁻¹) | C5-C7 (%) | C8-C14 (%) | C15-C18 (%) | C17/C18 |
|---|---|---|---|---|---|---|
| Palm oil | 350 | 1 | 3.4 | 10.0 | 86.5 | 5.8 |
|  | 330 | 1 | 1.7 | 4.9 | 93.4 | 5.5 |
|  | 310 | 1 | 1.0 | 2.7 | 96.2 | 5.2 |
| Methyl-esterified palm oil | 350 | 1 | 5.2 | 20.5 | 74.3 | 5.2 |
|  | 330 | 1 | 4.3 | 19.6 | 76.1 | 5.3 |
|  | 310 | 1 | 3.2 | 18.9 | 77.9 | 5.0 |
| Waste fatty acid | 350 | 1 | 3.2 | 10.5 | 86.0 | 6.3 |
|  | 330 | 1 | 1.7 | 4.9 | 93.4 | 6.3 |
|  | 310 | 1 | 1.0 | 2.7 | 96.2 | 5.4 |
| Genetically modified soybean oil | 350 | 1 | 6.2 | 15.6 | 78.2 | 6.0 |
|  | 330 | 1 | 5.3 | 18.4 | 76.3 | 5.6 |
|  | 310 | 1 | 4.8 | 16.2 | 79.0 | 5.2 |

From the catalytic results of the catalysts prepared using titanium dioxide-modified carrier through different times of impregnation in HDO of palm oil, it can be seen that, based on the composite carrier with regular pores, the particle size of the loaded metal active component gradually decreases with the increase of the number of impregnation times, and is reduced to a nano-scale or smaller when the impregnation is conducted six times; and as the particle size decreases, both the dispersion of the active component and the number of active sites increase. From the perspective of reaction, with the increase of the number of impregnation times, a ratio of C17 to C18 increases, indicating that the hydrodecarboxylation route has gradually become dominant, which increases the HDO activity, and reduces hydrogen consumption, hydrogen source loss, and energy consumption. A high C17 content indicates that the reaction is prone to the hydrodecarboxylation route and C is removed in the form of CO or $CO_2$; and a high C18 content indicates that the reaction is prone to the hydrodehydration route and $H_2O$ is removed, which increases the corrosion of water vapor to the catalyst and reduces a life of the catalyst. It can be seen from Tables 1 and 4 that, with the increase of the number of impregnation times, a C17/C18 ratio increases and a proportion of C17 in the biodiesel product increases, which also proves that the multi-stage impregnation can increase active sites of the catalyst, reduce the production of water, and improve a life of the catalyst.

The multi-stage impregnation for the zirconium dioxide-modified carrier results in a similar effect to the multi-stage impregnation for the titanium dioxide-modified carrier, and the reaction data in Tables 2 and 5 also show similar laws, indicating that the catalysts prepared using the zirconium dioxide-modified carrier through multi-stage impregnation also have improved HDO activity.

As shown in Tables 3 and 6, conventional carrier-based catalysts and modified carrier-based catalysts prepared through the same number of impregnation times are compared, it can be known that the HDO activity drops sharply at a low temperature and thus the raw material cannot be converted into liquid alkane fuel components, resulting in yellow flocculent precipitates to block a reactor; the modified carrier with high hydrothermal stability can change the adaptability of the catalyst; and the decrease of the temperature among the reaction conditions can reduce the reaction risk factor and the production cost. In addition, the multi-stage impregnation process without roasting has the same effect as the ordinary one-time impregnation, and cannot achieve the physical and chemical parameters of the highly-dispersed hydrogenation catalyst; a catalyst prepared by the multi-stage impregnation process without roasting shows similar hydrogenation activity to a catalyst prepared by the ordinary one-time impregnation process; and in contrast, the catalyst prepared through the multi-stage impregnation and roasting process has more active sites, stronger hydrogenation activity, and longer lasting stability.

Table 7 shows the HDO reaction data of different oils under the catalyst prepared through three times of impregnation. Different oils have different compositions, and thus the selectivities for alkanes obtained through HDO, hydrodecarboxylation, and hydrodecarbonylation are different, but the overall HDO activities are all very high and stable. In addition to the long-chain alkane-based components, some medium and long-chain alkane components and short-chain alkane components can also be obtained, and thus the product can be used as a bio-jet fuel and a bio-aviation gasoline, resulting in high utilization.

The biofuel products were further verified below. With the diesel component as an example, an alkane product obtained after HDO (an HDO product of palm oil or a waste fatty acid) was subjected to rectification, and a distillate at 170° C. to 300° C. was recovered as the biodiesel component, and tested for various physical and chemical properties using diesel No. 0 according to the 20% volume fraction blending standard. Results are shown in Tables 8 to 9, and it can be seen that all items meet the standards, indicating that the prepared biofuels fully comply with the existing diesel standards.

TABLE 8

Test results of physical and chemical properties of palm oil biodiesel

| Item | Quality standard No. 0 | Test result Diesel No. 0 | 20% blended palm oil biodiesel | Test method |
|---|---|---|---|---|
| Oxidative stability (calculated based on total insoluble matters)/(mg/100 ml) No more than | 2.5 | 0.3 | 0.4 | SH/T 0175 |
| Sulfur content, mg/kg No more than | 10 | 3.4 | 2.9 | SH/T 0689 |

TABLE 8-continued

Test results of physical and chemical properties of palm oil biodiesel

| Item | Quality standard No. 0 | Test result Diesel No. 0 | 20% blended palm oil biodiesel | Test method |
|---|---|---|---|---|
| Acidity (calculated based on KOH)/(mg/100 ml) No more than | 7 | 4.13 | 4.13 | GB/T 258 |
| Carbon residue based on a 10% distillation residue (mass fraction)/% No more than | 0.3 | 0.03 | 0.02 | GB/T 17144 |
| Ash content (mass fraction)/% No more than | 0.01 | 0.006 | 0.005 | GB/T 508 |
| Copper sheet corrosion (50° C., 3 h)/level No more than | 1 | 1a | 1a | GB/T 5096 |
| Water content (volume fraction)/% No more than | Trace | No water | No water | GB/T 260 |
| Lubricity Corrected wear scar diameter (60° C.)/μm, no more than | 460 | 391 | 376 | SH/T 0765 |
| Polycyclic aromatic hydrocarbon (PAH) content (mass fraction)/% No more than | 7 | 4.9 | 3.9 | SH/T 0806 |
| Total contaminant content/(mg/kg) | 24 | 2.5 | 3.0 | GB/T 33400 |
| Kinematic viscosity (20° C.)/(mm$^2$/s) | 3.0–8.0 | 4.371 | 4.388 | GB/T 265 |
| Condensation point/° C. Not higher than | 0 | −14 | −8 | GB/T 510 |
| Cold filter plugging point (CFPP)/° C. Not higher than | −5 | −13 | −10 | SH/T 0248 |
| Flash point (closed)/° C. Not lower than | 60 | 76.0 | 76.0 | GB/T 261 |
| Cetane number No less than | 51 | 55.4 | 55.2 | GB/T 386 |
| Cetane index No less than | 46 | 54.0 | 59.9 | SH/T 0694 |
| Distillation range | | | | |
| 50% recovery temperature/° C. not higher than | 300 | 269.5 | 271.5 | GB/T 6536 |
| 90% recovery temperature/° C. not higher than | 355 | 323.5 | 316.5 | |
| 95% recovery temperature/° C. not higher than | 365 | 340.5 | 334.5 | |
| Density (20° C.), kg/m$^3$ | 810–845 | 832.9 | 821.5 | GB/T 1884 GB/T 1885 |
| Fatty acid methyl ester (FAME) content (volume fraction)/% No more than | 1.0 | <0.1 | <0.1 | NB/SH/T 0916 |

TABLE 9

Test results of physical and chemical properties of waste fatty acid biodiesel

| Item | Quality standard No. 0 | Test result Diesel No. 0 | 20% blended waste fatty acid biodiesel | Test method |
|---|---|---|---|---|
| Oxidative stability (calculated based on total insoluble matters)/(mg/100 ml) No more than | 2.5 | 0.3 | 0.3 | SH/T 0175 |
| Sulfur content, mg/kg No more than | 10 | 3.4 | 2.8 | SH/T 0689 |
| Acidity (calculated based on KOH)/(mg/100 ml) No more than | 7 | 4.13 | 4.0 | GB/T 258 |
| Carbon residue based on a 10% distillation residue (mass fraction)/% No more than | 0.3 | 0.03 | 0.01 | GB/T 17144 |
| Ash content (mass fraction)/% No more than | 0.01 | 0.006 | 0.004 | GB/T 508 |
| Copper sheet corrosion (50° C., 3 h)/level No more than | 1 | 1a | 1a | GB/T 5096 |
| Water content (volume fraction)/% No more than | Trace | No water | No water | GB/T 260 |
| Lubricity Corrected wear scar diameter (60° C.)/μm, no more than | 460 | 391 | 374 | SH/T 0765 |

TABLE 9-continued

Test results of physical and chemical properties of waste fatty acid biodiesel

| Item | Quality standard No. 0 | Test result Diesel No. 0 | 20% blended waste fatty acid biodiesel | Test method |
|---|---|---|---|---|
| PAH content (mass fraction)/% No more than | 7 | 4.9 | 3.5 | SH/T 0806 |
| Total contaminant content/(mg/kg) | 24 | 2.5 | 3.2 | GB/T 33400 |
| Kinematic viscosity (20° C.)/(mm$^2$/s) | 3.0-8.0 | 4.371 | 4.288 | GB/T 265 |
| Condensation point/° C. Not higher than | 0 | −14 | −6 | GB/T 510 |
| CFPP/° C. Not higher than | −5 | −13 | −11 | SH/T 0248 |
| Flash point (closed)/° C. Not lower than | 60 | 76.0 | 75.0 | GB/T 261 |
| Cetane number No less than | 51 | 55.4 | 55.6 | GB/T 386 |
| Cetane index No less than | 46 | 54.0 | 59.8 | SH/T 0694 |
| Distillation range | | | | |
| 50% recovery temperature/° C. not higher than | 300 | 269.5 | 270.5 | GB/T 6536 |
| 90% recovery temperature/° C. not higher than | 355 | 323.5 | 315.5 | |
| 95% recovery temperature/° C. not higher than | 365 | 340.5 | 332.3 | |
| Density (20° C.), kg/m$^3$ | 810-845 | 832.9 | 822.5 | GB/T 1884 GB/T 1885 |
| FAME content (volume fraction)/% No more than | 1.0 | <0.1 | <0.1 | NB/SH/T 0916 |

Some examples of the present disclosure are described above in detail, which are merely preferred examples of the present disclosure and cannot be construed as limiting the scope of implementation of the present disclosure. Any equivalent modifications, improvements, and the like made within the application scope of the present disclosure should fall within the protection scope of the present disclosure.

What is claimed is:

1. A hydrogenation catalyst, wherein the hydrogenation catalyst is obtained by loading an active component on an aluminum oxide composite carrier through 2 to 6 times of impregnation and roasting, wherein
MA-PP and an SCA undergo amidation to obtain a reaction product, then γ-Al$_2$O$_3$ and TBT or TBZ are added into the reaction product to obtain a solid material, and the solid material is dried and roasted to form the aluminum oxide composite carrier, wherein the aluminum oxide composite carrier is an aluminum oxide-titanium dioxide carrier or an aluminum oxide-zirconium dioxide carrier,
wherein active component loaded particles in the hydrogenation catalyst have a particle size of 0.1 nm to 10 nm.

2. The hydrogenation catalyst according to claim 1, wherein the active component comprises a main active metal component and a synergistic component;
the main active metal component is Ni; and
the synergistic component is one or more selected from the group consisting of Co, Mo and W.

3. A method for preparing a biofuel from palm oil, methyl-esterified palm oil, a waste fatty acid, or genetically modified soybean oil, comprising: pretreating the hydrogenation catalyst according to claim 1, and performing hydrodeoxygenation (HDO) of the palm oil, the methyl-esterified palm oil, the waste fatty acid, or the genetically modified soybean oil with a pretreated hydrogenation catalyst.

4. The hydrogenation catalyst according to claim 1, wherein a mass percentage of the titanium dioxide in the aluminum oxide composite carrier is 5% to 20%.

5. The hydrogenation catalyst according to claim 1, wherein a mass percentage of the zirconium dioxide in the aluminum oxide composite carrier is 5% to 20%.

6. The hydrogenation catalyst according to claim 1, wherein the SCA is KH-550; and
MA-PP is added to an ethanol solution with KH-550 under hot water reflux to allow the amidation under stirring, a ratio of a mass of the KH-550 to a volume of the ethanol solution is (1-5):100, and a ratio of a mass of the MA-PP to a volume of the ethanol solution is (1-5):100.

7. A method for preparing a hydrogenation catalyst, comprising: loading an active component on an aluminum oxide composite carrier through one-stage or multi-stage impregnation, wherein
MA-PP and an SCA undergo amidation to obtain a reaction product, then γ-Al$_2$O$_3$ and TBT or TBZ are added into the reaction product to obtain a solid material, and the solid material is dried and roasted to form the aluminum oxide composite carrier, wherein the aluminum oxide composite carrier is an aluminum oxide-titanium dioxide carrier or an aluminum oxide-zirconium dioxide carrier.

8. The method according to claim 7, wherein the impregnation is conducted n times; a staged impregnation solution has a concentration of $Y_n$, and a sum of concentrations of impregnation solutions in all stages is X;
$Y_n$=X/n; and n is an integer selected from 1 to 6.

9. The method according to claim 7, wherein
a staged impregnation is conducted specifically as follows:
completely dissolving a metal salt of the active component in water to prepare a staged impregnation solution, adding the staged impregnation solution to the aluminum oxide composite carrier, and thoroughly stirring for impregnation to obtain an impregnated solid material; and drying and roasting the impregnated solid material to form a staged catalyst;
wherein a product obtained after the last impregnation is the hydrogenation catalyst.

* * * * *